United States Patent [19]

Ishii

[11] 4,183,082

[45] Jan. 8, 1980

[54] REGULATED POWER SUPPLY

[75] Inventor: Shouichi Ishii, Warabi, Japan

[73] Assignee: Tokyo Shibaura Electric Co., Ltd., Kawasaki, Japan

[21] Appl. No.: 677,720

[22] Filed: Apr. 16, 1976

[30] Foreign Application Priority Data

Apr. 21, 1975 [JP] Japan .................................. 50-48394

[51] Int. Cl.[2] ............................................ H02M 7/217

[52] U.S. Cl. ........................................ 363/89; 323/20; 323/22 T; 323/25

[58] Field of Search ............... 321/16, 18, 19; 323/20, 323/22 T, 38; 363/89, 126, 127

[56] References Cited

U.S. PATENT DOCUMENTS

| | | | |
|---|---|---|---|
| 3,564,388 | 2/1971 | Nolf | 321/18 |
| 3,566,246 | 2/1971 | Seer | 321/18 |
| 3,581,187 | 2/1971 | Grady | 321/18 UX |
| 3,697,854 | 10/1972 | Berger | 321/18 X |

*Primary Examiner*—A. D. Pellinen

*Attorney, Agent, or Firm*—Oblon, Fisher, Spivak, McClelland & Maier

[57] ABSTRACT

A regulated power supply capable of providing an output DC voltage of substantially constant level determined by an AC line voltage to a load irrespective of variations in load current. The regulated power supply comprises first and second rectifiers adapted to generate unregulated DC voltages in accordance with an input AC voltage, a control circuit coupled between the load and the first rectifier and including at least one active device, and a voltage comparator adapted to compare the output of the second rectifier and the output of the detector and generate an output proportional to a difference between the second rectifier output and the detector output, thereby controlling the control circuit and regulating the DC voltage to a constant level corresponding to the input AC voltage irrespective of variations in load current. The regulated power supply can prominently decrease a permissible dissipation of the active device in the control circuit and it is therefore very suitable for a power supply in an audio amplifier.

6 Claims, 5 Drawing Figures

REGULATED POWER SUPPLY

BACKGROUND OF THE INVENTION

This invention relates to a regulated power supply and in particular a regulated power supply for providing an output DC voltage of substantially constant level which depends on the magnitude of an input AC line voltage to a load irrespective of variations in load current.

A variety of DC voltage regulators are known in the art. Among these, a series-type voltage regulator is most widely used. Such a series-type voltage regulator comprises a rectifier circuit connected to receive an input AC voltage for generating an unregulated DC voltage, a control circuit connected between the rectifier circuit and a load and including at least one control semiconductor active device having a control electrode, a detector circuit for detecting variation in the regulated DC output voltage applied to the load, a reference voltage generating circuit, and a voltage comparator circuit adapted to compare the output of the detector circuit and the reference voltage of the reference voltage generating circuit and generate an error signal proportional to a difference between the output of the detector circuit and the reference voltage, thereby controlling the control circuit.

The series-type voltage regulator is capable of regulating an output DC voltage to a predetermined level irrespective of variations in the input AC voltage and load current. With variations in the inpt AC voltage in view, the voltage regulator should disadvantageously allow for a very great permissible dissipation in the control active device or transistor. Suppose, for example, that a variation width of a nominal 100 V input AC voltage is $\pm10\%$, and an unregulated output DC voltage of the rectifier circuit including a transformer is 50 V when the input AC voltage is 100 V and load current is zero ampere. Suppose further that, in this case, a regulated output DC voltage is 40 V, a load current is 0 to 5 A, and the internal resistance of the rectifier circuit is 1 ohm. Then, a maximum permissible dissiplation allowed for in the control transistor will become about 50 W when the input AC voltage is 110 V and load current is 5 A. This wattage is of the order of a magnitude required for output transistors in an audio stereophonic amplifier and this means that the control transistor requires, like the output transistor, a large-sized heat sink. The adaption of such regulated power supply circuit to an audio amplifier leads to a raise in cost of the audio amplifier. For this reason, the regulated power supply circuit is rarely employed in a commercially available amplifier. In order to improve a reproduction quality of the audio amplifier, however, it is preferable to use, as a power supply circuit for an output stage, a power supply circuit which involves no output voltage variation at least with respect to variations in load current, i.e., has a very small output impedance.

SUMMARY OF THE INVENTION

It is accordingly the object of this invention to provide a regulated power supply circuit, particularly suitable for an audio amplifier, which is capable of maintaining a substantially constant output voltage irrespective of variations in load current and attaining a considerably small maximum permissible dissipation of a control device or devices, i.e., being low in cost.

The above-mentioned object of this invention is attained by providing, instead of a reference voltage generating circuit in the above-mentioned conventional regulated power supply, a second rectifier circuit adapted to deliver an unregulated DC voltage corresponding to the input AC voltage to a voltage comparator.

In the regulated power supply according to this invention, the output DC voltage is varied dependent upon variations in input AC voltage, but it is not varied by variations in load current. That is, this invention can provide a power supply with a small output impedance.

When the regulated power supply according to this invention is used in an audio amplifier, variations in output DC voltage due to variations in input AC voltage has no substantial adverse influence on the audio amplifier. Since the output stage of an ordinary audio amplifier has a negative feedback, a voltage gain of the amplifier per se is barely changed dependent upon the variations in the power supply voltage. Although maximum output power of the amplifier is subjected to an influence dependent upon the variations in the power supply voltage it is seldom that in actual practice the amplifier is driven fully to the maximum output power, and the input AC voltage, though varied, is very slow in its variation, since a commercial power supply is usually employed.

In the regulated power supply according to this invention, an increase in input AC voltage results in an increase in ouput DC voltage and a decrease in input AC voltage results in decreased output DC voltage. In consequence, a voltage between the collector and emitter of a control transistor becomes lower and thus permissible dissipation of the control transistor can become much smaller as compared with the case where the conventional regulated power supply is used. Therefore, it will be sufficient if a control transistor or transistors are mounted on a heat sink for an audio amplifier.

BRIEF DESCRIPTION OF THE DRAWING

This invention will be further described by way of example by referring to the drawings in which.

DESCRIPTION OF THE PREFERRED EMBODIMENT

Figure 1:
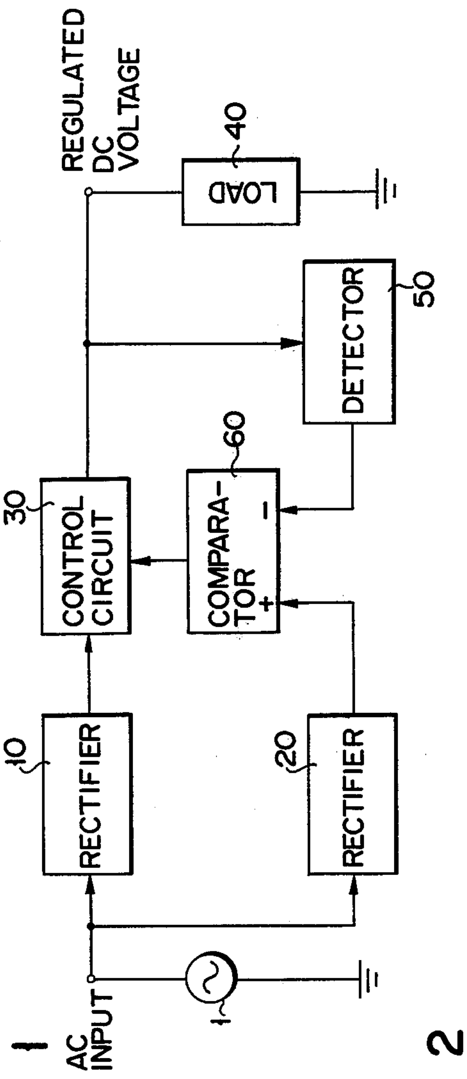
FIG. 1 is a block diagram embodying this invention.

In FIG. 1, reference numeral 10 is a first rectifier for converting an AC input line voltage to a first unregulated DC voltage having a value corresponding to the AC input line voltage and adapted to be regulated subsequently. Reference numeral 20 is a second rectifier for generating a second unregulated DC voltage having a value corresponding to the input voltage and adapted to be used as a comparison reference voltage. It is needless to say that the output voltages of the rectifiers vary with the input voltage. A commercial AC power source 1 is connected as an AC input voltage source to inputs of the first and second rectifiers 10 and 20.

A control circuit 30 including at least one active device is connected between the first rectifier 10 and a load 40 such as an audio-amplifier to which a regulated DC voltage is applied. A detector 50 is adapted to detect a variation in the regulated DC output voltage from the control circuit 30 and provide a DC voltage having a value corresponding to the regulated DC voltage and adapted to be compared with an output voltage of the second rectifier circuit 20. A voltage comparator 60 is adapted to receive an output signal of the second rectifier 20 at the plus terminal or non-inverting terminal thereof and an output signal of the detector 50 at the minus or inverting terminal thereof to generate an amplified output voltage proportional to a difference between these signals, thus controlling the control circuit and regulating the unregulated DC output voltage from the first rectifier circuit 10.

The block diagram in FIG. 1 is different from the prior art circuit diagram in that, in the latter circuit, a reference voltage generating section using a Zener diode is connected to the non-inverting terminal of the comparator 60. It will be easy understood that, since in a voltage regulator according to this invention the comparison reference voltage varies according to the AC input voltage, a DC output voltage to be supplied to the load 40 varies with variations in AC input voltage and does not vary with variations in load current.

Figure 2:
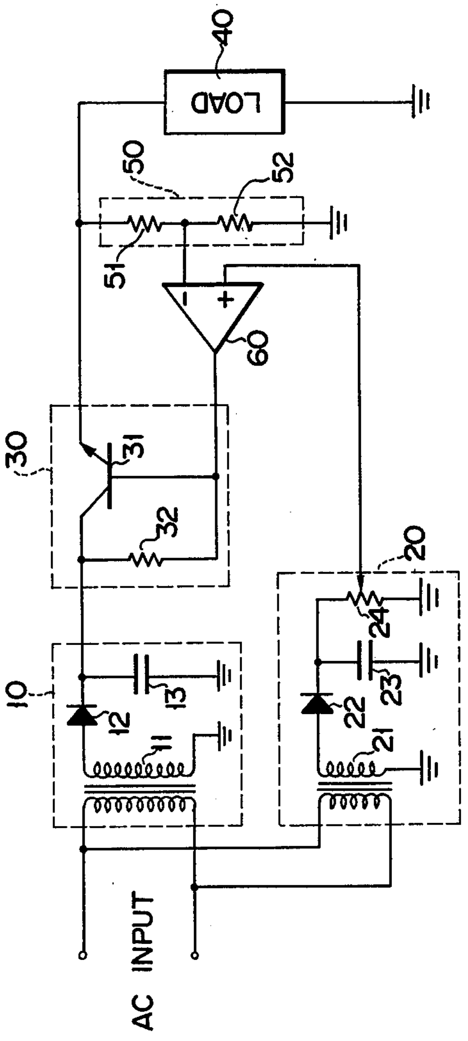
FIG. 2 is a schematic circuit diagram showing a power supply circuit according to this invention.

FIG. 2 shows a schematic circuit arrangement of a regulated power supply according to this invention, in which identical reference numerals are used to designate parts or elements corresponding to those shown in FIG. 1. A first rectifier 10 comprises a transformer 11, diode 12 and smoothing capacitor 13 and a second rectifier 20 comprises a transformer 21, diode 22, smoothing capacitor 23 and a potentiometer 24. The slider of potentiometer 24 is connected to a non-inverting terminal of a voltage comparator 60 such as a differential amplifier. A control circuit 30 comprises an NPN type transistor 31 having a collector connected to the output of the first rectifier 10, an emitter connected to one end of a load 40 with the other end of the load 40 being connected to circuit ground, and a base connected to the output of the comparator 60, and a resistor 32 connected between the collector and the base of transistor 31. A detector 50 is constituted of a voltage divider connected in parallel to the load 40 and including resistors 51 and 52. A junction of these resistors 51 and 52 is coupled to an inverting terminal of the comparator 60.

Figure 3:
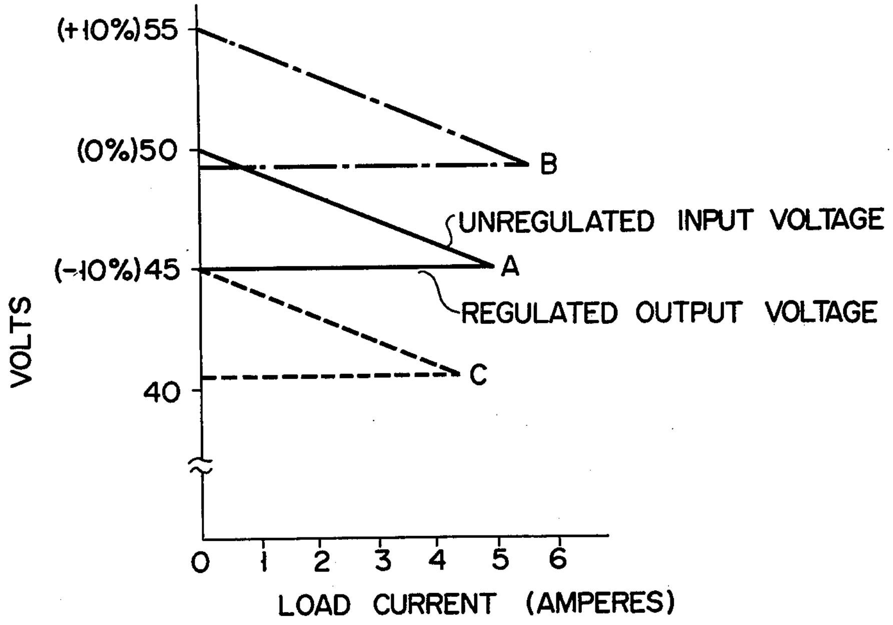
FIG. 3 is a diagram showing a characteristic of a power supply according to this invention.

FIG. 3 shows the voltage regulating characteristics of the power supply circuit according to this invention. Suppose, for example, that as shown in characteristic (A) in FIG. 3 the output voltage of the rectifier 10 is 50 volts when a 100 V (nominal value) AC input voltage is supplied to the first rectifier 10 and load current is zero ampere. Then, an unregulated DC input voltage to the control circuit 30 is lowered with an increase in load current owing to the output impedance (for example, one ohm) of the rectifier 10, but the output voltage of the control circuit is regulated to a predetermined value of 45 volts irrespective of variations in load current. If the AC input voltage varies by, for example, ±10%, output voltage applied to the load varies according to the input voltage, but it is not varied by a variation in load current. As shown in a characteristic (B) in FIG. 3, when output voltage of the rectifier 10 is 55 volts at no load, the regulated output voltage has a predetermined value of 49 volts and, as shown in a characteristic (C) in FIG. 3, when output voltage of the rectifier 10 is 45 volts at no load, the regulated output voltage has a predetermined value of 40.5 volts.

Figure 4:
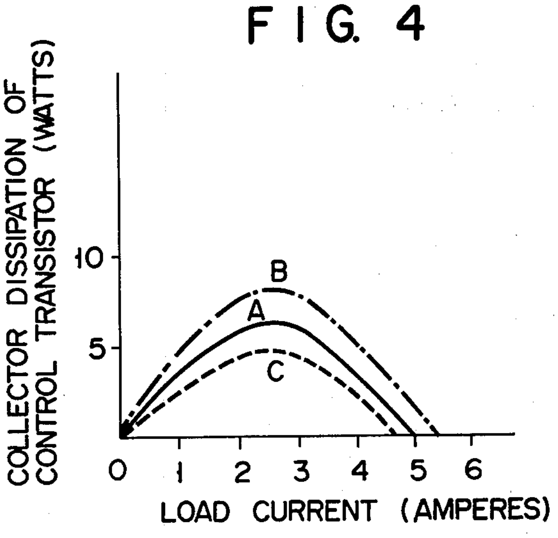
FIG. 4 is a graph showing a power dissipation of the control transistor for use in the constant voltage power supply circuit according to this invention.

FIG. 4 shows power dissipation characteristics of the control transistor 31 which correspond to the characteristics in FIG. 3. It will be understood that, even when as shown in the characteristic (B) in FIG. 4 the AC input voltage is varied by an amount of ±10% with the characteristic (A) as a reference, a maximum dissipation is about 8 W, a value far less than the dissipation of control transistor in the prior art regulated power supply circuit.

Now consider an influence exerted by the second rectifier on the output impedance of the regulated power supply circuit.

A voltage gain Gv and current gain Gi as viewed from the non-inverting input terminal of the voltage comparator are given as follows:

$$Gv=\Delta Vo/\Delta Vi$$

$$Gi=\Delta Io/\Delta Ii$$

where

ΔVo: change in the regulated output voltage

ΔIo: change in output current or load current

ΔVi: change in the output voltage of the second rectifier

ΔIi: change in the output current of the second rectifier

Since the output impedance Zi of the second rectifier is ΔVi/ΔIi and the output impedance Zo of the regulated power supply circuit is ΔVo/ΔIo, $$Zo=(Gv/Gi)\,Zi$$

In order to make the output impedance Zo of the regulated power supply small, it is desirable that the voltage gain Gv is as small as possible, and the current gain Gi is as large as possible. It is also desirable to make the output impedance of the second rectifier small. In order to provide a greater current gain Gi, it is preferable to make the current gain of the control circuit great. That is, it is preferable to use Darlington-connected transistors rather than a single semiconductor active device or transistor as shown in FIG. 2. To provide a small voltage gain Gv, it is advisable to approach a feedback factor of unity by making the output voltage of the second rectifier substantially equal to the output voltage of the power supply. It is impossible, however, to obtain a feedback factor greater than unity. The second rectifier may be of a smaller capacity and a current capacity of about several milliamperes will be sufficient, though it is dependent upon the current gain of the comparator.

Figure 5:
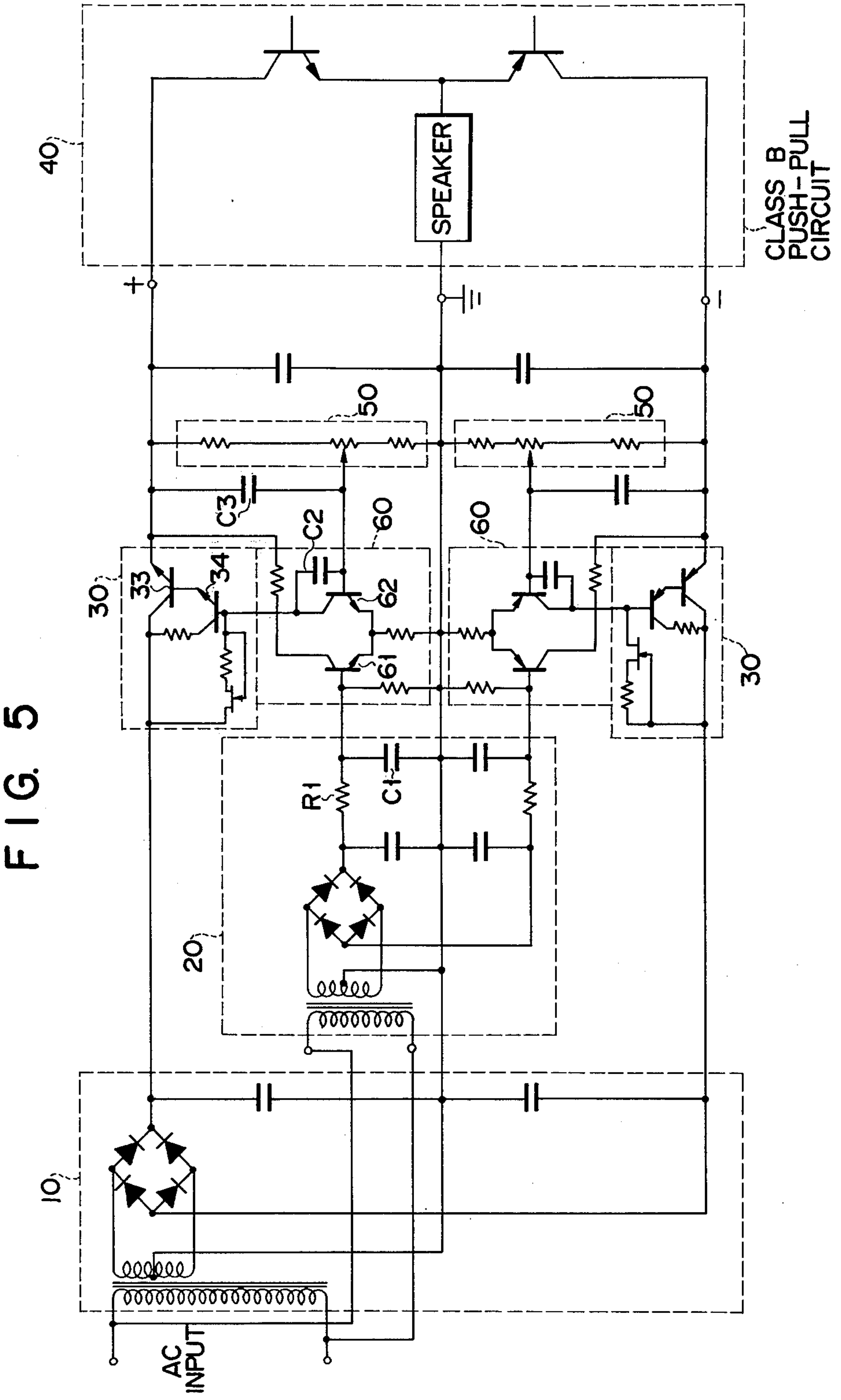
FIG. 5 is a schematic circuit diagram of a power supply circuit according to this invention for providing positive and negative supply voltages to a class B push-pull output amplifier.

FIG. 5 shows a regulated power supply, according to this invention, which can provide positive and negative power supply voltages to a class B push-pull output amplifier as a load. Since each circuit per se constituting a power supply circuit according to this invention is well known in the art, any further explanation will be omitted by using identical reference numerals to designate parts or elements corresponding to those shown in FIG. 1.

In FIG. 5 a control circuit 30 uses Darlington-connected transistors 33 and 34 so as to make the abovementioned gain Gi greater. A comparator 60 is a differential amplifier including transistors 61 and 62 coupled in a common-emitter configuration. To make output impedance Zo of the power supply circuit smaller, it is desirable to make a value of a resistor R1 used as a filter in a second rectifier 20 smaller and a value of a capacitor C1 greater. Capacitors C2 and C3 permit a feedback circuit of the power supply circuit to operate in a good condition even at high frequencies.

What is claimed is:

1. A power source for an audio amplifier for providing to a load a regulated DC voltage of substantially constant level irrespective of variations in load current, the constant level depending on an input AC voltage, and comprising:

first rectifier means connected to receive the input AC voltage for generating a first unregulated DC voltage varying with the input AC voltage;

second rectifier means connected to receive the input AC voltage for generating a second unregulated DC voltage varying with the input AC voltage;

control circuit means DC coupled between said load and said first rectifier means and comprising at least one active device having a control electrode for regulating the first unregulated DC voltage;

detecting means DC coupled between said load and said control circuit means for detecting variation in the regulated DC voltage and for developing an output DC voltage varying with the regulated DC voltage; and comparing means coupled to receive the second unregulated DC voltage of said second rectifier means and the output DC voltage of said detecting means for developing an error signal proportional to a difference between the second unregulated DC voltage and the output DC voltage, the error signal being coupled to the control electrode of the active device in said control circuit to regulate the first unregulated DC voltage to thereby produce the regulated DC voltage.

2. The power source for an audio amplifier according to claim 1, in which said active device includes a transistor.

3. The power source for an audio amplifier according to claim 1, in which said active device includes Darlington-connected transistors.

4. The power source for an audio amplifier according to claim 1, in which said comparing means includes a differential amplifier.

5. The power source for an audio amplifier according to claim 1, in which said audio amplifier circuit includes a Class B push-pull amplifier circuit.

6. The power source for an audio amplifier according to claim 1, in which the output voltage of said second rectifier means is approximately equal to the regulated DC voltage.

* * * * *